Sept. 28, 1948.
R. REIK
2,450,057
PROCESS FOR RECOVERING MAGNESIUM FROM
MAGNESIA-CONTAINING MATERIALS
Filed Dec. 1, 1945
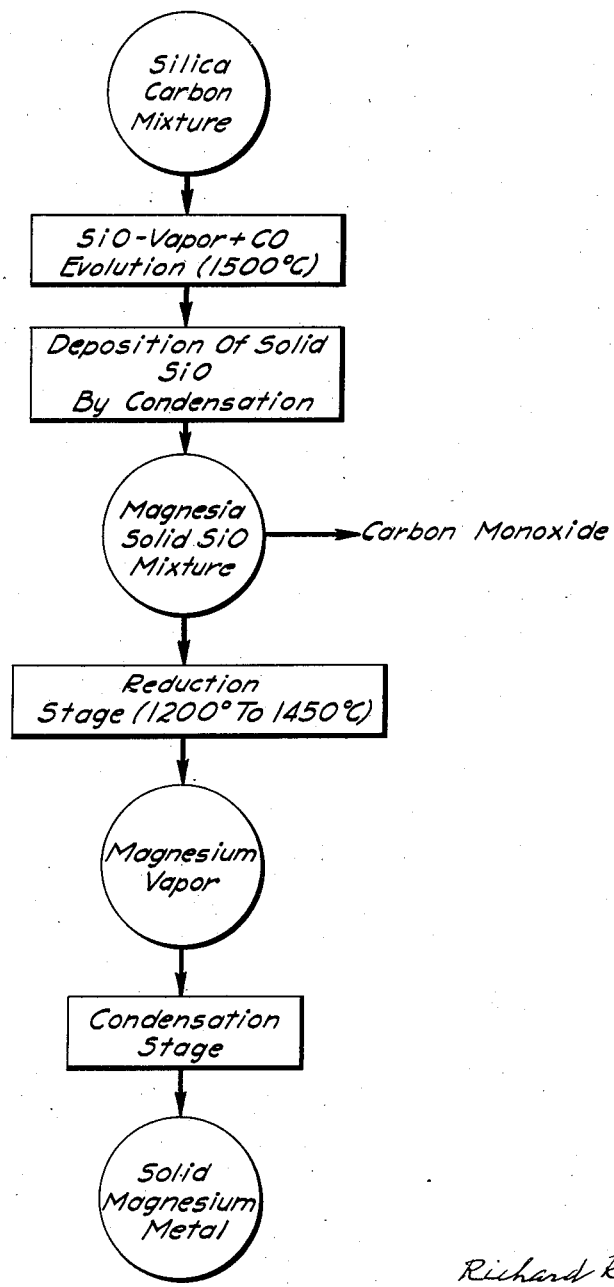
*Richard Reik*
INVENTOR.

Patented Sept. 28, 1948

2,450,057

UNITED STATES PATENT OFFICE 2,450,057

PROCESS FOR RECOVERING MAGNESIUM FROM MAGNESIA-CONTAINING MATERIALS

Richard Reik, Piedmont, Calif.

Application December 1, 1945, Serial No. 632,174

6 Claims. (Cl. 75—67)

This invention relates to an improved process for recovering magnesium by reduction with silicon monoxide, using carbon as the primary reducing agent.

It is among the major objects of the invention to provide a method of preparing a reduction charge which comprises an intimate mixture of the material to be reduced and of silicon monoxide (SiO) serving as the reducing agent, without having recourse to fine grinding and special mixing arrangements. Another object is to incorporate silicon monoxide of a high degree of purity with the charge while using ordinary forms of silica ($SiO_2$) as the starting material or starting with undecomposed silicates. In another of its aspects the invention contemplates the provision of a reduction method that is capable of being carried out at temperatures readily achievable in ordinary fuel-fired furnaces and furnishes the elemental metal in the vapor phase without carbon monoxide (CO) being associated therewith, in spite of adopting carbon as the original reducing agent.

The process according to the invention involves in general forming a reduction charge by passing a stream of vaporous silicon monoxide into intimate contact with the material to be reduced and causing solid silicon monoxide to be deposited, by condensation, directly from the vapor phase within the said material, and then heating the charge thus prepared to reduction temperature and condensing the vapor of elemental metal disengaged. In a preferred embodiment of the invention silicon monoxide vapor is generated, in a preliminary stage of the process, by partial reduction of $SiO_2$ through reacting, under exclusion of air, on ordinary forms of silica with a carbonaceous reducing agent according to the reaction $SiO_2 + C = SiO + CO$ at a temperature in the neighborhood, advantageously slightly above, 1500° C. In such a way, SiO is lively disengaged in the state of vapor whereas non-volatile impurities are left behind. By exhausting the vapor evolved from the heated system and contacting a finely divided metal oxide-containing prime material therewith in an artificially cooled zone or in a precooled condition for a sufficient time, a reduction charge is formed in which every single particle of the initial material to be reduced occurs in association with an adequate proportion of very finely divided solid SiO, while the carbon monoxide evolving during the partial reduction of the silica passes out. The charge is then admitted into a heated zone for effecting the main reduction and liberating the elemental metal in the vapor state without CO. Under reduced pressure the reduction proceeds readily between 1200° C. and 1450° C. depending on the degree of vacuum employed.

The preparation of the charge may be carried out by passing the material to be reduced in the form of an unbroken continuously moving stream through a substantially cylindrical revolving chamber, which is artificially cooled and set at a slight declination so that that material works its way slowly therethrough. A mixture of SiO vapor and CO gas generated by partial reduction of silica with carbonaceous reducing agent is introduced at the end opposite to that in which the material to be reduced is introduced, and caused to ascend through the downward moving stream of the said material. Air is to be excluded to prevent reoxidation of the silicon monoxide. The relative proportions of solid raw material caused to move downward and of SiO vapor passed in countercurrent thereto are adjusted in such a manner that the deposition of the equivalent of reducing agent stoichiometrically required is accomplished as soon as the raw material arrives at the discharge end. The CO gas passes out at the charging end. The mixture of initial material and solid silicon monoxide is then transferred to a reduction chamber that opens into a condensation chamber adjacent to the reduction chamber in an axial direction where the vapor of elemental metal evolved in the reduction zone may be condensed as a solid deposit, both these chambers being equipped with means imparting movement to them around the axis of the reaction chamber. There is no necessity of an intermediate briquetting operation, and also further grinding of the material is dispensable, provided that the initial material to be reduced was in a sufficiently fine state of subdivision.

It will be seen that the invention permits the recovery of metals which are in the state of vapor at the reduction temperature with elusion of the difficulties arising from the concurrent formation of carbon monoxide, and without the use of electric furnaces, and if desired in a continuous operation.

A specific embodiment of the invention may further be illustrated with reference to the accompanying drawing which shows the flow of materials diagrammatically in a method of producing magnesium from magnesiferous raw materials.

SiO vapor is disengaged by heating a mixture of silica (e. g. quartz sand) and coke sand, containing 82.7 per cent by weight of $SiO_2$ and 17.3 per cent by weight of carbon, to a temperature slightly above 1500° C. The SiO-vapor evolved together with CO is contacted with a precooled magnesiferous raw material for a time sufficient to produce an agglomerate containing approximately equal amounts by weight of magnesia and solid silicon monoxide, while the CO gas is allowed to escape. Those skilled in the art will have no difficulty in determining the exact conditions, which depend also on the prevailing temperature, by some preliminary tests. This magnesia-SiO mixture is then maintained in a reduction zone at a temperature between 1250° C. and 1450° C. to liberate magnesium as a vapor which is finally condensed.

Although active evolution of SiO in the form of vapor does not take place but at temperatures in the neighborhood of 1500° C., the suboxide has an appreciable vapor tension even at lower temperatures, say in the vicinity of 1200° C. This is the reason why I have found it to be a general rule that in using SiO as the agent for recovering metals by reduction that are volatile at the reduction temperature, the presence of any excess of reducing agent has rigorously to be avoided in whatever manner the reduction may be performed. In this special reduction operation it is even recommendable to introduce an excess of the prime material, in full contrast to the customary precautionary measure of introducing an excess of the reducing agent into the charge to ensure complete exhaustion of the prime material. For if there were some excessive SiO present in the main reduction stage, there would inevitably be some SiO vapor generated, which were bound to mix with the vapor of elemental metal evolved and to condense in association therewith, and thus to contaminate the compact metal eventually produced; on the other hand, a slight excess of prime material does not matter.

In the course of the reaction taking place in the main reduction zone, the silicon monoxide passes over into the dioxide. It was known that said silica tends to combine with the basic compounds present, MgO or CaO, up to the formation of orthosilicates ($2MgO.SiO_2$ or $2CaO.SiO_2$ or $MgO.CaO.SiO_2$) and that therefore 4 moles of bases are required for satisfying one mol of Si. Starting from those suppositions it has amongst other things been suggested to use dolomites (instead of magnesites) as the starting materials, in which case the reaction was found to occur according to the equation:

$$2(MgO.CaO) + Si = 2Mg + 2CaO.SiO_2$$

(cf. French Specification No. 800,163, 1936). In such a way, CaO is substituted for the proportion of magnesia which would otherwise be combined to orthosilicate and thereby restrained from reduction. Later on it has been suggested by Eduard Zintl and Hans Grube, to avoid such losses of magnesia in performing the reduction with silicon monoxide (in place of silicon) in a similar way, that is to say by carrying out the reduction in the presence of such an amount of lime that the total amount of $SiO_2$ formed during the reaction is bound as calcium orthosilicate, or by starting with calcareous prime materials, such as natural dolomites, while supplementing the CaO content by appropriate quicklime additions. This process forms the subject matter of the U. S. Patent No. 2,286,663. It is to be emphasized that Zintl et al. propose to effect the reduction with the aid of commercial SiO that was previously isolated in the solid state and contained only 60% to 79% of SiO. In contradistinction thereto, it is proposed by the present invention to use SiO in the vapor form for preparing the charge by depositing finely divided solid SiO directly from the vapor phase within the prime material to be reduced in intimate contact therewith. In this process, it is recommendable even to incorporate an appropriate proportion of CaO with the initial material to be reduced or to use prime materials calcareous by nature, such as particularly dolomites, instead of magnesiferous materials, as was already disclosed in the French Specification No. 800,163 mentioned above. When starting with a commercial dolomite which contains 55% of CaO and 35% of MgO in addition to 2% of $SiO_2$ and 4% of $Fe_2O_3 + Al_2O_3$, the CaO content has preferably to be filled up by adding 45.8% of quicklime. Yet in the finished charge, in this case also a SiO content in excess of the proportion stoichiometrically required according to the equation  is carefully to be avoided.

Small percentages (1 to 2% of the total mixture of material to be reduced and reducing agent) of chlorides or/and fluorides of alkali or alkaline-earth metals, e. g. 1.0 part by weight of fluoride, may be admixed with the charge in order to increase the reaction velocity in the main reduction stage. The incorporation of accelerators of that kind has already been disclosed as advisable in the Belgian Patent No. 410,505 (cf. Gmelins Handbuch der Anorganischen Chemie, 8th edition, system Number 27, part A, p. 134, 1937).

In lieu of oxidic ores, such as calcined dolomites or magnesites, precipitated magnesias, particularly sea water magnesium hydroxide, can advantageously be taken as the magnesiferous prime material. Sea water magnesium hydroxide averages substantially higher in purity than magnesia originating from ores and is not only in itself in a fine state of division but, owing to its lower breakdown temperature, forms magnesia under heat which is less dense than oxides obtained by calcination of ores. Moreover, magnesium silicates or carbonates may also be used as the initial materials in the place of oxidic ores, as was already revealed by Guy Gire and Robert Fouquet in 1932 (cf. British Specification No. 382,899).

The residue that remains after carrying out the main reduction is returned in cycle to serve for the evolution of SiO vapor by partial reduction with carbon in the preliminary stage of the process. It may be noted that in the before mentioned British Specification No. 382,899 the proposition was already made to reduce at a high temperature magnesia or dolomite or a silicate or carbonate of magnesium by silicon (while condensing the vapor produced), and to treat the residue, which remains after carrying out the reduction, with carbon for the purpose of regenerating the silicon and employing it for reducing a further quantity of magnesia (cf. claim 5).

I claim:

1. A method of recovering magnesium by reduction; which method comprises subjecting a silica containing starting material to the action of carbon at a temperature at which vaporous SiO is generated while allowing the vapor evolved continually to escape into a non-oxidizing atmosphere for the purpose of avoiding complete reduction of the $SiO_2$ to Si, and at once suddenly condensing the SiO-vapor to avoid its decomposition into $SiO_2$ and Si, said condensation being brought about by passing the Sio-vapor into intimate contact with a magnesia containing material to be reduced while said material is cold enough for the SiO-vapor to condense therein; and then heating the reduction charge thus prepared to reduction temperature and condensing the magnesium vapor disengaged.

2. A method of recovering magnesium by reduction; which method comprises subjecting a silica containing starting material to the action of carbon at a temperature that is at most in the neighborhood of 1500° C. while causing the vapor continually to escape into a non-oxidizing atmosphere, and at once suddenly condensing the SiO-vapor to avoid its decomposition into $SiO_2$ and Si, said condensation being brought about by passing the SiO-vapor into intimate contact with the magnesia containing material to be reduced which is maintained at a temperature low enough for the SiO-vapor to condense therein; and then heating the reduction charge thus prepared to reduction temperature and condensing the magnesium vapor disengaged.

3. A method of recovering magnesium by reduction which method comprises reducing silica with carbonaceous matter at a temperature at which SiO liberated in the form of vapor according to the equation $SiO_2+C=SiO+CO$ while allowing the gaseous reaction products continually to escape into a non-oxidizing atmosphere, passing the SiO-vapor and CO-gas mixture evolved at once into intimate contact with the material to be reduced, which material is kept cold enough for the SiO-vapor to condense therein, and thereby causing solid SiO to be deposited directly from the vapor phase within the said material, while the CO-gas is caused to pass off, a slight excess of the material to be reduced over the stoichiometrically required proportion of reducing agent being left in the charge; and then heating the charge thus prepared to reduction temperature and condensing the vapor disengaged.

4. The method of recovering magnesium by reduction, which comprises reducing a siliceous initial material with carbonaceous matter at a temperature at which SiO is liberated in the form of vapor according to the equation $$SiO_2+C=SiO+CO$$

while allowing the gaseous reaction products continually to escape into a non-oxidizing atmosphere, passing the SiO-vapor and CO-gas mixture evolved into intimate contact with a magnesia-containing material which is cold enough for the SiO-vapor to condense therein and thereby causing solid SiO to be deposited within said material while the accompanying CO-gas is caused to pass off; and then heating the reduction charge thus prepared to reduction temperature and condensing the magnesium vapor disengaged, the residue left behind being returned in cycle.

5. The method of recovering magnesium by reduction which comprises reducing a siliceous initial material with carbon at a temperature at which SiO is liberated in the form of vapor while allowing the gaseous reaction products continually to escape into a non-oxidizing atmosphere, and then passing the SiO-vapor and CO-gas mixture evolved into intimate contact with a dolomitic magnesia-prime material which is cold enough for the SiO-vapor to condense therein and thereby causing solid SiO to be deposited within said prime material while the accompanying CO-gas is caused to pass off; and then heating the reduction charge thus prepared to reduction temperature and condensing the magnesium vapor disengaged, the residue left behind being returned in cycle.

6. The method of recovering magnesium by reduction of undecomposed magnesium silicates, which comprises heating the initial silicate material in the presence of carbon to a temperature at which SiO is liberated in the form of vapor while causing the vaporous silicon monoxide to escape freely and thus overcoming the silicate combination without reduction of $SiO_2$ to Si taking place to any substantial extent, the SiO vapor produced being used for the reduction to metallic magnesium of the MgO component of the initial silicate.

RICHARD REIK.

REFERENCES CITED

The following references are of record in the file of this patent:

UNITED STATES PATENTS

| Number | Name | Date |
|---|---|---|
| 1,104,384 | Potter | July 21, 1914 |
| 2,123,990 | Erdmann | July 19, 1938 |
| 2,248,472 | Zintl et al. | July 8, 1941 |
| 2,286,663 | Zintl et al. | June 16, 1942 |
| 2,379,576 | Hansgirg | July 3, 1945 |

FOREIGN PATENTS

| Number | Country | Date |
|---|---|---|
| 382,899 | Great Britain | Nov. 3, 1932 |